US012028331B2

(12) United States Patent
Qiu et al.

(10) Patent No.: US 12,028,331 B2
(45) Date of Patent: Jul. 2, 2024

(54) FORMAL VERIFICATION METHOD FOR CERTIFICATE STORAGE SMART CONTRACT, COMPUTER DEVICE, AND NON-TRANSITORY COMPUTER-READABLE STORAGE MEDIUM

(71) Applicant: Hangzhou Qulian Technology Co., Ltd., Zhejiang (CN)

(72) Inventors: Weiwei Qiu, Zhejiang (CN); Wei Li, Zhejiang (CN); Liang Cai, Zhejiang (CN); Shuai Zhang, Zhejiang (CN); Lizhong Kuang, Zhejiang (CN)

(73) Assignee: Hangzhou Qulian Technology Co., Ltd., Hangzhou (CN)

( * ) Notice: Subject to any disclaimer, the term of this patent is extended or adjusted under 35 U.S.C. 154(b) by 240 days.

(21) Appl. No.: 17/636,139

(22) PCT Filed: Aug. 21, 2020

(86) PCT No.: PCT/CN2020/110512
§ 371 (c)(1),
(2) Date: Feb. 17, 2022

(87) PCT Pub. No.: WO2021/032192
PCT Pub. Date: Feb. 25, 2021

(65) Prior Publication Data
US 2022/0294776 A1    Sep. 15, 2022

(30) Foreign Application Priority Data

Aug. 21, 2019  (CN) .......................... 201910772491.4

(51) Int. Cl.
G06F 7/04       (2006.01)
G06F 21/64      (2013.01)
H04L 9/40       (2022.01)

(52) U.S. Cl.
CPC .......... H04L 63/0823 (2013.01); G06F 21/64 (2013.01)

(58) Field of Classification Search
CPC ......... H04L 9/50; H04L 63/0823; H04L 9/32; H04L 9/3263; G06F 21/33; G06F 21/64
See application file for complete search history.

(56) References Cited

U.S. PATENT DOCUMENTS

2008/0015883 A1    1/2008  Hermann
2020/0034469 A1*   1/2020  Sato .................... G06F 16/1834
(Continued)

FOREIGN PATENT DOCUMENTS

CN    107783758    3/2018
CN    108776936    11/2018
(Continued)

OTHER PUBLICATIONS

Bernabe et al, Privacy-Preserving Solutions for Blockchain: Review and Challenges, IEEE, Oct. 31, 2019, pp. 1-33. (Year: 2019).*
(Continued)

Primary Examiner — Philip J Chea
Assistant Examiner — Jenise E Jackson

(57) ABSTRACT

A formal verification method for a certificate storage smart contract is provided. The method includes: obtaining the certificate storage smart contract, and performing certificate storage, forensic, and certificate storage and forensic authority granting according to different production environments and authority; adding standardization statements of formal standardization into the certificate storage smart contract; and obtaining a verification result by performing model verification on the certificate storage smart contract into which the standardization statements of the formal verification are added. A computer device and a non-transitory computer-readable storage medium are further provided.

9 Claims, 2 Drawing Sheets

(56) References Cited

U.S. PATENT DOCUMENTS

| | | | | |
|---|---|---|---|---|
| 2020/0201838 A1* | 6/2020 | Ciocarlie | ............... | G06F 21/577 |
| 2020/0387440 A1* | 12/2020 | Shao | ................... | G06F 11/3608 |
| 2021/0124722 A1* | 4/2021 | Srivastava | ......... | G06Q 20/1235 |

FOREIGN PATENT DOCUMENTS

| | | |
|---|---|---|
| CN | 108985073 | 12/2018 |
| CN | 109375899 | 2/2019 |
| CN | 110147942 | 8/2019 |
| CN | 110555320 | 12/2019 |
| WO | WO 2019/108676 | 6/2019 |

OTHER PUBLICATIONS

Phong Le et al., BIFF: A Blockchain-based IoT Forensics Framework with Identity Privacy, IEEE, Oct. 31, 2018, pp. 2372-2377. (Year: 2018).*

Notice of Reasons for Refusal dated Apr. 5, 2023 From the Japan Patent Office Re. Application No. 2022-510096 and Its Translation Into English. (6 Pages).

Bhargavan et al. "Formal Verification of the Smart Contracts: Short Paper", Proceedings of the 2006 ACM Workshop on Programming Languages and Analysis for Security, p. 91-96, Oct. 24, 2016. & Abstract.

Nehai et al. "Model Checking of Smart Contracts", IEEE International Conference on Internet of Things, iThings, IEEE Green Computing and Communications, GreenCom, IEEE Cyber, Physical and Social Computing, CPSCom and IEEE Samrt Data, SmartData, Halifax, NS, Canada, Jul. 30-Aug. 3, 2018, p. 980-987, Jul. 30, 2018. & Abstract.

Supplementary European Search Report and the European Search Opinion dated Aug. 30, 2023 From the European Patent Office Re. Application No. 20853855.3. (10 Pages).

Hajdu et al. "SOLC-VERIFY: A Modular Verifier for Solidity Smart Contracts", ArXiv Preprint ArXiv: 1907.04262v1, XP081622664, p. 1-18, Jul. 9, 2019.

Zheng et al. "A Hybrid Formal Verification System in Coq for Ensuring the Reliability and Security of Ethereum-Based Service Smart Contracts", ArXiv Preprint ArXiv: 1902.08726v1, XP081032467, 31 P., Feb. 23, 2019.

International Search Report and the Written Opinion dated Oct. 28, 2020 From the International Searching Authority Re. Application No. PCT /CN2020/11 0512 and Its Translation of Search Report Into English. (10 Pages).

Notification of Office Action and Search Report dated Nov. 25, 2020 From the State Intellectual Property Office of the People's Republic of China Re. Application No. 201910772491.4. (4 Pages).

Communication Pursuant to Article 94(3) EPC Dated Mar. 7, 2024 From the European Patent Office Re. Application No. 20853855.3. (8 Pages).

* cited by examiner

FORMAL VERIFICATION METHOD FOR CERTIFICATE STORAGE SMART CONTRACT, COMPUTER DEVICE, AND NON-TRANSITORY COMPUTER-READABLE STORAGE MEDIUM

RELATED APPLICATIONS

This application is a National Phase of PCT Patent Application No. PCT/CN2020/110512 having International filing date of Aug. 21, 2020, which claims the benefit of priority of China Patent Application No. 201910772491.4 filed on Aug. 21, 2019. The contents of the above applications are all incorporated by reference as if fully set forth herein in their entirety.

FIELD AND BACKGROUND OF THE INVENTION

The present disclosure relates to the field of smart contract and formal verification technology, in particular to a formal verification method and system for a certificate storage smart contract, a computer device, and a readable storage medium.

Blockchain is distributed data management technology which realizes decentralization based on data encryption, timestamp, and distributed consensus mechanism, and has characteristics of traceability, non-tampering, and high availability. Smart contracts serve as a commitment defined in digital form, promises to control digital assets, includes rights and obligations agreed by contract participants, and is automatically executed by a computer system. The emergence of blockchain technology provides a programmable digital system for the smart contracts. Formal verification is an effective method in the current smart contract security audit program and compares function description with an actual code through mathematical logic to check whether the code meets an expected result. As a common contract application field, security of auditing certificate storage smart contracts through the formal verification is a prerequisite for the authenticity and traceability of a certificate storage result. However, the current smart contract development community does not have corresponding security standardization for certificate storage business. This makes the development of certificate storage smart contracts prone to security vulnerabilities. Accordingly, development process standardization for the certificate storage smart contracts and a template for the smart contracts based on the formal verification are required to provide an important security reference for design and development of the certificate storage smart contracts.

SUMMARY OF THE INVENTION

According to various embodiments of the present disclosure, a formal verification method and system for a certificate storage smart contract is provided. The method includes the following steps: (1) compiling the certificate storage smart contract, and performing certificate storage, forensic, and certificate storage and forensic authority granting according to different production environments and authority;

(2) adding formal standardization of the contract: adding standardization statements for standardizing and describing formal verification including abnormality, an incoming parameter, an outgoing parameter, state transfer of the persistent variables, and invariants in a smart contract function into the certificate storage smart contract in step (1); and (3) performing contract model verification: performing model verification on the certificate storage smart contract into which standardization of the formal verification are added; when the standardization of the formal verification is met, the formal verification passes; and when the standardization of the formal verification is not met, locations of a sentence and the storage smart contract which do not meet the formal verification are positioned.

In an embodiment, in S1 in step (1), the certificate storage smart contract meets the following conditions:

(a) a data structure of a certificate storage user, a forensic user, and an administrators: a persistent variable with a mapping type is used for recording information of an identity of the certificate storage user and information of an identity of the forensic user, and a persistent variable with an array type is used for recording information of an identity of the administrator;

(b) a data structure for storing certificate storage information: multiple persistent variables with the mapping type are used for recording the certificate storage information in compliance with multiple certificate storage modes; and (c) authority control: a modifier is used for performing the authority control on a method related to the certificate storage, the forensic, and the certificate storage and forensic authority granting.

In an embodiment, in S1 in step (2), the forming the formal standardization of the contract includes:

(a) adding abnormality capture standardization into a contract method including: standardizing and requiring a sufficient and necessary condition that abnormality occurs in a certificate storage scene to be that a certificate storage user does not have a certificate storage qualification and certificate storage data is invalid; standardizing and requiring a sufficient and necessary condition that abnormality occurs in a forensic scene to be that a forensic user does not have a forensic qualification and a forensic token does not exist; and all persistent variables cannot be changed in a situation that abnormality occurs;

(b) performing formal verification on the incoming parameter and the outgoing parameter of the contract method including: standardizing and requiring to perform the formal verification on the incoming parameter from the function, and performing expected verification on the outgoing parameter from the function; and (c) standardizing and describing the state transfer of the persistent variables in the contract method including: standardizing and requiring to confirm that in various types of certificate storage methods, a persistent variable with a mapping type in the certificate storage is added by the certificate storage data; confirming that in a method of the forensic, all persistent variables cannot be changed; and confirming a change of an information table of the certificate storage user and the forensic user in a method of the certificate storage and forensic authority granting S5, a stored form of a calculated forwarding path is node name: node name.

In an embodiment, in step (3), the performing the contract model verification of the smart contract refers to performing, by a theorem prover, a theorem proving on the smart contract compiling the formal standardization to obtain the verification result.

According to various embodiments of the present disclosure, a formal verification method for a certificate storage smart contract is further provided. The method includes the following steps:

obtaining the certificate storage smart contract, and performing certificate storage, forensic, and certificate storage and forensic authority granting according to different production environments and authority;

adding standardization statements of formal standardization into the certificate storage smart contract, wherein the standardization statements are used for standardizing and describing formal verification including abnormality, an incoming parameter, an outgoing parameter, state transfer of persistent variables, and invariants in a smart contract function; and obtaining a verification result by performing model verification on the certificate storage smart contract into which the standardization statements of the formal verification are added; when standardization of the formal verification is met, the formal verification passes; and when the standardization of the formal verification is not met, locations of a sentence and the storage smart contract which do not meet the formal verification are positioned.

In an embodiment, the obtaining the certificate storage smart contract and performing the certificate storage, the forensic, and the certificate storage and forensic authority granting according to the different production environments and the authority include the following steps:

using a persistent variable with a mapping type for recording information of an identity of a certificate storage user and information of an identity of a forensic user, and using a persistent variable with an array type for recording information of an identity of an administrator;

using multiple persistent variables with the mapping type for recording the certificate storage information in compliance with multiple certificate storage modes; and using a modifier for performing authority control on the storage, the forensic, and the storage and forensic authority granting.

In an embodiment, the adding the standardization statements of the formal standardization into the certificate storage smart contract includes the following steps:

adding abnormality capture standardization including: standardizing and requiring a sufficient and necessary condition that abnormality occurs in a certificate storage scene to be that a certificate storage user does not have a certificate storage qualification and certificate storage data is invalid; standardizing and requiring a sufficient and necessary condition that abnormality occurs in a forensic scene to be that a forensic user does not have a forensic qualification and a forensic token does not exist; and all persistent variables cannot be changed in a situation that abnormality occurs;

adding formal verification of the incoming parameter and the outgoing parameter including: performing the formal verification on the incoming parameter from the smart contract function, and performing expected verification on the outgoing parameter from the function; and adding standardization statements of the state transfer of the persistent variables including: confirming that in various types of certificate storage methods, a persistent variable with a mapping type in the certificate storage is added by the certificate storage data; confirming that in a method of the forensic, all persistent variables cannot be changed; and confirming a data change in a certificate user and forensic user information table in a method of the certificate storage and forensic authority granting.

In an embodiment, the obtaining the verification result by performing the model verification on the certificate storage smart contract into which the standardization statements of the formal standardization are added includes the following step:

performing, by a theorem prover, a theorem proving on the smart contract into which the standardization statements of the formal verification are added to obtain the verification result.

According to various embodiments of the present disclosure, a verification system for a certificate storage smart contract is further provided. The system includes a contract obtaining module, a standardization adding module, and a formal verification module;

the contract obtaining module is configured to: obtain the certificate storage smart contract; and perform certificate storage, forensic, and certificate storage and forensic authority granting according to different production environments and authority;

the standardization adding module is configured to: add standardization statements of formal verification, wherein the standardization statements are used for standardizing and describing the formal verification including abnormality, an incoming parameter, an outgoing parameter, state transfer of persistent variables, and invariants in a smart contract function; and the formal verification module is configured to: obtain a verification result by performing model verification on the certificate storage smart contract into which the standardization statements of the formal verification are added; when standardization of the formal verification is met, the formal verification passes; and when the standardization of the formal verification is not met, locations of a sentence and the storage smart contract which do not meet the formal verification are positioned.

In an embodiment, the contract obtaining module is further configured to: use a persistent variable with a mapping type for recording information of an identity of a certificate storage user and information of an identity of a forensic user, and use a persistent variable with an array type for recording information of an identity of an administrator; use multiple persistent variables with the mapping type for recording certificate storage information in compliance with multiple certificate storage modes; and use a modifier for performing authority control on the certificate storage, the forensic, and the certificate storage and forensic authority granting.

In an embodiment, the standardization adding module is further configured to: add abnormality capture standardization including: standardizing and requiring a sufficient and necessary condition that abnormality occurs in a certificate storage scene to be that the certificate storage user does not have a certificate storage qualification and the certificate storage data is invalid; standardizing and requiring a sufficient and necessary condition that abnormality occurs in a forensic scene to be that the forensic user does not have a forensic qualification and the forensic token does not exist; and all persistent variables cannot be changed in a situation that abnormality occurs.

The standardization adding module is further configured to: add formal verification of the incoming parameter and the outgoing parameter including: performing the formal verification on the incoming parameter from the function, and performing expected verification on the outgoing parameter from the function.

The standardization adding module is further configured to: add standardization statements of the state transfer of the persistent variables including: confirming that in various types of certificate storage methods, the persistent variable with the mapping type in the certificate storage is added by the certificate storage data; confirming that in a method of the forensic, all persistent variables cannot be changed; and confirming a data change in a certificate user and forensic user information table in a method of the certificate storage and forensic authority granting.

In an embodiment, the formal verification module is further configured to: perform, by a theorem prover, a theorem proving on the smart contract into which the standardization statements of the formal verification are added to obtain the verification result.

According to various embodiments of the present disclosure, a computer device is further provided and includes a memory and a processor. The memory stores computer programs. The processor is configured to execute the computer programs to implement steps in any one of the above-mentioned formal verification methods for the certificate storage smart contract.

According to various embodiments of the present disclosure, a computer-readable storage medium is further provided and includes computer programs stored thereon. The computer programs are executed by a processor to implement steps in any one of the above-mentioned formal verification methods for the certificate storage smart contract.

BRIEF DESCRIPTION OF THE SEVERAL VIEWS OF THE DRAWINGS

In order to better describe and illustrate embodiments and/or examples of the present disclosure herein, one or more drawings may be referred to. The additional details or examples used to describe the drawings should not be considered as limiting the scope of the present disclosure, the currently described embodiments and/or examples, and the best mode of the present disclosure currently understood.

DESCRIPTION OF SPECIFIC EMBODIMENTS OF THE INVENTION

In order to facilitate the understanding of the present disclosure and to make the above-mentioned objectives, features and advantages of the present disclosure more obvious and understandable, specific embodiments of the present disclosure are described in detail below with reference to the accompanying drawings. In the following description, many specific details are explained in order to fully understand the present disclosure, and preferred embodiments of the present disclosure are shown in the accompanying drawings. However, the present disclosure can be implemented in many different forms and is not limited to the embodiments described herein. On the contrary, the purpose of providing these embodiments is to make the understanding of the content of the present disclosure more thorough and comprehensive. The present disclosure can be implemented in many other ways different from those described herein, and those skilled in the art can make similar improvements without violating the connotation of the present disclosure. Therefore, the present disclosure is not limited by the specific embodiments disclosed below.

Furthermore, the terms "first" and "second" are for descriptive purposes only and should not be construed as indicating or implying relative importance or implying the number of technical features. As such, the features defined by the term "first" and "second" may include the at least one feature explicitly or implicitly. In the description of the present disclosure, "more" refers to at least two, such as two, three and so on, unless otherwise specifically defined. In the description of the present disclosure, "several" refers to at least one, such as one, two and so on, unless otherwise specifically defined.

Unless otherwise defined, all technical and scientific terms used herein have the same meaning as commonly understood by those skilled in the technical field of the present disclosure. The terminology used herein is only for the purpose of describing specific embodiments and is not intended to limit the present disclosure. The term "and/or" as used herein includes any and all combinations of one or more related listed items.

Figure 1:
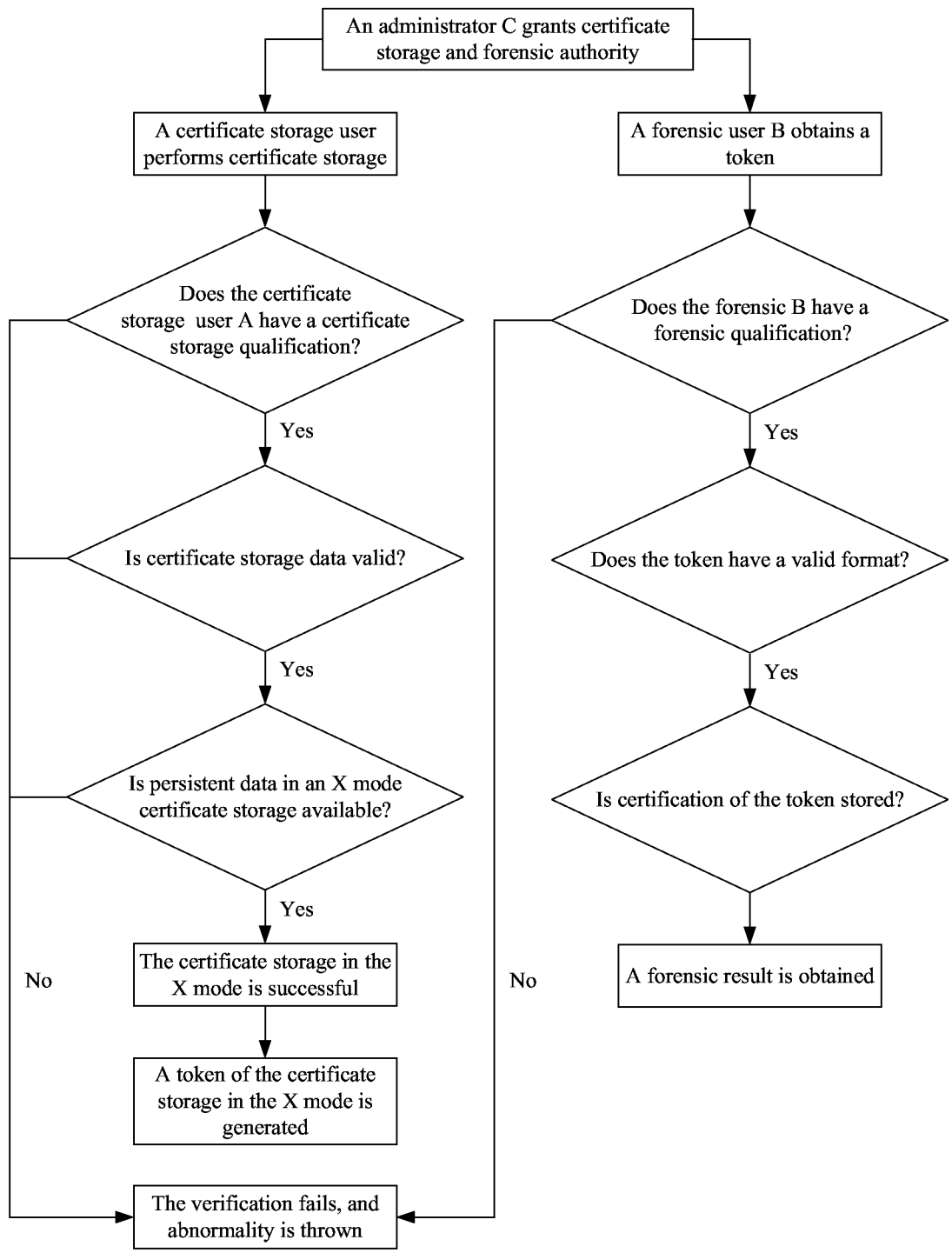
FIG. 1 illustrates a flowchart of formal verification for a certificate storage smart contract based on a blockchain according to an embodiment of the present disclosure.

FIG. 1 illustrates a flowchart of formal verification for a certificate storage smart contract based on a blockchain provided by an embodiment. As shown in FIG. 1, a process of the formal verification for the certificate storage smart contract based on the blockchain is described as follows.

(1) The certificate storage smart contract is compiled. According to specific production environments and authority, certificate storage, forensic, and certificate storage and forensic authority granting are performed. Access authority of a contract method needs to be standardized. The access authority of the method can be limited by adding a modifier to a header of the method. Limiting an identity of a function caller can improve overall security and reliability of a system. A certificate storage function is toward a user with certificate storage authority. The user can select a corresponding certificate storage function according to a type of the certificate storage and persist certificate storage data on a node of the blockchain. The certificate storage data cannot be tampered with and can be traced. An administrator grants a certificate storage authority module to a certificate storage user. The certificate storage user can perform a certificate storage operation only after obtaining certificate storage authority from the administrator. Formal standardization should describe that the administrator should be a member of administrator persistent data. Information of the certificate storage user is recorded in persistent data of the information of the certificate storage user. Other persistent variables are not changed. A forensic function is toward a user with forensic authority. The user can hold a forensic token for performing forensic. A forensic function returns a forensic result. The administrator grants a forensic authority module to a forensic user. The forensic user can perform a forensic operation only after obtaining forensic authority from the administrator. Formal standardization should describe that the administrator should be a member of the administrator persistent data. Information of the forensic user is recorded in persistent data of the information of the forensic user. Other persistent variables are not changed. The certificate storage and forensic authority granting is toward the administrator with highest authority. The administrator can manage the authority of the certificate storage user and authority of the forensic user.

The certificate storage smart contract meets the following conditions.

(a) A data structure of the certificate storage user, the forensic user, and the administrators: a persistent variable with a mapping type is used for recording information of an identity of the certificate storage user and information of an identity of the forensic user, and a persistent variable with an array type is used for recording information of an identity of the administrator.

(b) A data structure for storing certificate storage information: multiple persistent variables with the mapping type are used for recording the certificate storage information in compliance with multiple certificate storage modes.

(c) Authority control: the persistent variables and the contract method are generated by coding, the formal standardization should be added for the contract method, and the modifier is used for performing the authority control on a method related to the certificate storage, the forensic, and the certificate storage and forensic authority granting.

(2) The formal standardization of the contract is added. Standardization statements for standardizing and describing formal verification including abnormality, an incoming parameter, an outgoing parameter, state transfer of the persistent variables, and invariants in a smart contract function are added into the certificate storage smart contract in step (1). The formal standardization statements must be able to clearly and unambiguously describe an expected operation flow of the method to ensure correctness of a result of the formal verification.

Adding the formal standardization of the contract includes:

(a) adding abnormality capture standardization into the contract method including: standardizing and requiring a sufficient and necessary condition that abnormality occurs in a certificate storage scene to be that the certificate storage user does not have a certificate storage qualification and the certificate storage data is invalid; standardizing and requiring a sufficient and necessary condition that abnormality occurs in a forensic scene to be that the forensic user does not have a forensic qualification and the forensic token does not exist; and all persistent variables cannot be changed in a situation that abnormality occurs;

(b) performing formal verification on the incoming parameter and the outgoing parameter of the contract method including: standardizing and requiring to perform the formal verification on the incoming parameter from the function, and performing expected verification on the outgoing parameter from the function; and (c) standardizing and describing the state transfer of the persistent variables in the contract method including: standardizing and requiring to confirm that in various types of certificate storage methods, the persistent variable with the mapping type in the certificate storage is added by the certificate storage data; confirming that in a method of the forensic, all persistent variables cannot be changed; and in the various types of certificate storage methods, the persistent variable with the mapping type in the certificate storage is added by the certificate storage data; confirming that all persistent variables cannot be changed in a method of the forensic; and confirming a change of an information table of the certificate storage user and the forensic user in a method of the certificate storage and forensic authority granting.

(3) Contract model verification is performed. The contract model verification of the smart contract into which standardization of the formal verification is added refers to performing, by a theorem prover, a theorem proving on the smart contract compiling the formal standardization to obtain a verification result. When the formal standardization is met, the formal verification passes. When the formal standardization is not met, locations of a sentence and a specific contract code which do not meet the formal verification are positioned.

For a certificate storage module for a certificate storage user, the certificate storage user selects an appropriate certificate storage mode to perform blockchain certificate storage. The certificate storage is successful when following conditions must be met: the formal standardization should describe that the certificate storage user has a qualification for the storage, otherwise abnormality is thrown and the formal verification fails; the certificate storage data is a valid parameter in the certificate storage mode, otherwise abnormality is thrown and the formal verification fails; the persistent variable of the certificate storage result in the specific storage mode is available, otherwise abnormality is thrown and the formal verification fails; the function returns the forensic token conforming a format requirement after the certificate storage is successful, otherwise the formal verification fails; and during a process of the certificate storage, the certificate storage result is recorded in the persistent variable of the certificate storage result, and other persistent variables are not changed.

For a forensic module for a forensic user, the forensic user performs blockchain forensic. The forensic is successful when following conditions must be met: the formal standardization should describe that the forensic user has a qualification for the forensic, otherwise abnormality is thrown and the formal verification fails; the forensic token conforms a format requirement, otherwise abnormality is thrown and the formal verification fails; the forensic token exists in the persistent variable of the certificate storage, otherwise abnormality is thrown and the formal verification fails; the forensic a result is a storage result of a corresponding forensic token, otherwise the formal verification fails; and during a forensics process, all persistent variables are not changed.

Figure 2:
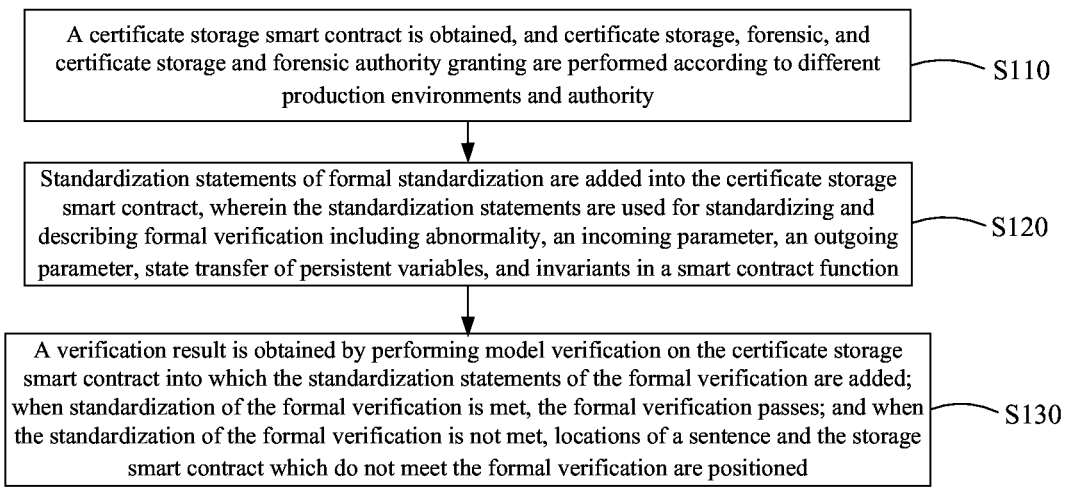
FIG. 2 illustrates a flowchart of a formal verification method for a certificate storage smart contract according to an embodiment of the present disclosure.

Further, for a certificate storage smart contract, as shown in FIG. 2, the following scheme can be used to implement the formal verification.

In S110, a certificate storage smart contract is obtained, and certificate storage, forensic, and certificate storage and forensic authority granting are performed according to different production environments and authority.

In S120: standardization statements of formal standardization are added into the certificate storage smart contract, wherein the standardization statements are used for standardizing and describing formal verification including abnormality, an incoming parameter, an outgoing parameter, state transfer of persistent variables, and invariants in a smart contract function.

In S130, a verification result is obtained by performing model verification on the certificate storage smart contract into which the standardization statements of the formal verification are added; when standardization of the formal verification is met, the formal verification passes; and when the standardization of the formal verification is not met, locations of a sentence and the storage smart contract which do not meet the formal verification are positioned.

In the present embodiment, blockchain smart contract developers are provided with a formal verification method for the certificate storage smart contract, and development of certificate storage projects equipped with smart contracts of the blockchain is provided with security reference. The formal standardization is defined in the front of the certificate storage smart contract method body and transformed into a mathematical model which can be recognized by a theorem prover. The result of the formal verification is obtained by mathematical deduction, thereby improving security and reliability of the certificate storage smart contract, reducing a test cost of a traditional contract, and having a wide logic range. The most basic certificate storage contract model and its formal verification method are provided, and relevant reference for expansion and optimization of the certificate storage contract is provided, and good applicability is provided.

In an embodiment, the obtaining the certificate storage smart contract and performing the certificate storage, the forensic, and the certificate storage and forensic authority granting according to the different production environments and the authority include the following steps:

using a persistent variable with a mapping type for recording information of an identity of a certificate storage user and information of an identity of a forensic user, and using a persistent variable with an array type for recording information of an identity of an administrator;

using multiple persistent variables with the mapping type for recording the certificate storage information in compliance with multiple certificate storage modes; and using a modifier for performing authority control on the storage, the forensic, and the storage and forensic authority granting.

In the present embodiment, access authority of a contract method needs to be standardized. The access authority of the method can be limited by adding a modifier to a header of the method. Limiting an identity of a function caller can improve overall security and reliability of a system. A certificate storage function is toward a user with certificate storage authority. The user can select a corresponding certificate storage function according to a type of the certificate storage and persist certificate storage data on a node of the blockchain. The certificate storage data cannot be tampered with and can be traced. An administrator grants a certificate storage authority module to a certificate storage user. The certificate storage user can perform a certificate storage operation only after obtaining certificate storage authority from the administrator. Formal standardization should describe that the administrator should be a member of administrator persistent data. Information of the certificate storage user is recorded in persistent data of the information of the certificate storage user. Other persistent variables are not changed. A forensic function is toward a user with forensic authority. The user can hold a forensic token for performing forensic. A forensic function returns a forensic result. The administrator grants a forensic authority module to a forensic user. The forensic user can perform a forensic operation only after obtaining forensic authority from the administrator. Formal standardization should describe that the administrator should be a member of the administrator persistent data. Information of the forensic user is recorded in persistent data of the information of the storage user. Other persistent variables are not changed. The certificate storage and forensic authority granting is toward the administrator with highest authority. The administrator can manage the authority of the certificate storage user and authority of the forensic user.

In an embodiment, the adding the standardization statements of the formal standardization into the certificate storage smart contract includes the following steps:

adding abnormality capture standardization including: standardizing and requiring a sufficient and necessary condition that abnormality occurs in a certificate storage scene to be that the certificate storage user does not have a certificate storage qualification and the certificate storage data is invalid; standardizing and requiring a sufficient and necessary condition that abnormality occurs in a forensic scene to be that the forensic user does not have a forensic qualification and the forensic token does not exist; and all persistent variables cannot be changed in a situation that abnormality occurs;

adding formal verification of the incoming parameter and the outgoing parameter including: performing the formal verification on the incoming parameter from the smart contract function, and performing expected verification on the outgoing parameter from the function; and adding standardization statements of the state transfer of the persistent variables including: confirming that in various types of certificate storage methods, the persistent variable with the mapping type in the certificate storage is added by the certificate storage data; confirming that in a method of the forensic, all persistent variables cannot be changed; and confirming a data change in a certificate user and forensic user information table in a method of the certificate storage and forensic authority granting.

Specifically, for a certificate storage module for a certificate storage user, the certificate storage user selects an appropriate certificate storage mode to perform blockchain certificate storage. The certificate storage is successful when following conditions must be met: the formal standardization should describe that the certificate storage user has a qualification for the storage, otherwise abnormality is thrown and the formal verification fails; the certificate storage data is a valid parameter in the certificate storage mode, otherwise abnormality is thrown and the formal verification fails; the persistent variable of the certificate storage result in the specific storage mode is available, otherwise abnormality is thrown and the formal verification fails; the function returns the forensic token conforming a format requirement after the certificate storage is successful, otherwise the formal verification fails; and during a process of the certificate storage, the certificate storage result is recorded in the persistent variable of the certificate storage result, and other persistent variables are not changed.

For a forensic module for a forensic user, the forensic user performs blockchain forensic. The forensic is successful when following conditions must be met: the formal standardization should describe that the forensic user has a qualification for the forensic, otherwise abnormality is thrown and the formal verification fails; the forensic token conforms a format requirement, otherwise abnormality is thrown and the formal verification fails; the forensic token exists in the persistent variable of the certificate storage, otherwise abnormality is thrown and the formal verification fails; the forensic a result is a storage result of a corresponding forensic token, otherwise the formal verification fails; and during a forensics process, all persistent variables are not changed.

In an embodiment, the obtaining the verification result by performing the model verification on the certificate storage smart contract into which the standardization statements of the formal verification are added includes the following step:

performing, by a theorem prover, a theorem proving on the smart contract into which the standardization statements of the formal verification are added to obtain the verification result.

Figure 3:
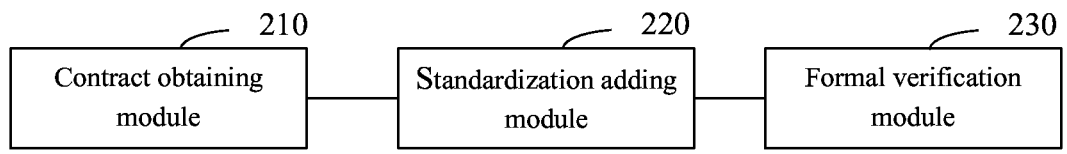
FIG. 3 illustrates a schematic structure diagram of a formal verification system for a certificate storage smart contract according to an embodiment of the present disclosure.

In an embodiment, as shown in FIG. 3, a formal verification system for a certificate storage smart contract is provided and includes: a contract obtaining module 210, a standardization adding module 220, and a formal verification module 230.

The contract obtaining module 210 is configured to: obtain the certificate storage smart contract; and perform certificate storage, forensic, and certificate storage and forensic authority granting according to different production environments and authority.

The standardization adding module 220 is configured to: add standardization statements of formal verification, wherein the standardization statements are used for standardizing and describing the formal verification including abnormality, an incoming parameter, an outgoing parameter, state transfer of persistent variables, and invariants in a smart contract function.

The formal verification module 230 is configured to: obtain a verification result by performing model verification on the certificate storage smart contract into which the standardization statements of the formal verification are added; when standardization of the formal verification is met, the formal verification passes; and when the standardization of the formal verification is not met, locations of a sentence and the storage smart contract which do not meet the formal verification are positioned.

In an embodiment, the contract obtaining module 210 is further configured to: use a persistent variable with a mapping type for recording information of an identity of a certificate storage user and information of an identity of a forensic user, and use a persistent variable with an array type for recording information of an identity of an administrator; use multiple persistent variables with the mapping type for recording certificate storage information in compliance with multiple certificate storage modes; and use a modifier for performing authority control on the certificate storage, the forensic, and the certificate storage and forensic authority granting.

In an embodiment, the standardization adding module 220 is further configured to: add abnormality capture standardization including: standardizing and requiring a sufficient and necessary condition that abnormality occurs in a certificate storage scene to be that the certificate storage user does not have a certificate storage qualification and the certificate storage data is invalid; standardizing and requiring a sufficient and necessary condition that abnormality occurs in a forensic scene to be that the forensic user does not have a forensic qualification and the forensic token does not exist; and all persistent variables cannot be changed in a situation that abnormality occurs.

The standardization adding module 220 is further configured to: add formal verification of the incoming parameter and the outgoing parameter including: performing the formal verification on the incoming parameter from the function, and performing expected verification on the outgoing parameter from the function.

The standardization adding module 220 is further configured to: add standardization statements of the state transfer of the persistent variables including: confirming that in various types of certificate storage methods, the persistent variable with the mapping type in the certificate storage is added by the certificate storage data; confirming that in a method of the forensic, all persistent variables cannot be changed; and confirming a data change in a certificate user and forensic user information table in a method of the certificate storage and forensic authority granting.

In an embodiment, the formal verification module 230 is further configured to: perform, by a theorem prover, a theorem proving on the smart contract into which the standardization statements of the formal verification are added to obtain the verification result.

Specific embodiments of the formal verification system for the certificate storage smart contract can be referred to description of the above-mentioned embodiments of the formal verification method for the certificate storage smart contract and are not repeated herein. The various modules in the formal verification system for the certificate storage smart contract can be implemented in whole or in part by software, hardware, and a combination thereof. The above-mentioned modules can be embedded in a form of hardware or independent of a processor in a computer device, or can be stored in a memory of the computer device in a form of software, so that the processor can call and execute operations corresponding to the above-mentioned modules.

Figure 4:
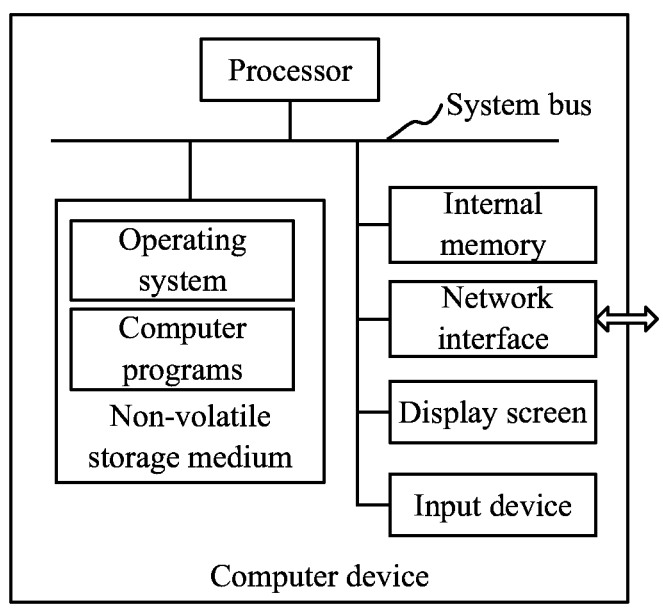
FIG. 4 illustrates an internal structure diagram of a computer device according to an embodiment of the present disclosure.

In an embodiment, a computer device is provided. The computer device can be a terminal, and its internal structure diagram can be as shown in FIG. 4. The computer device includes a processor, a memory, a network interface, a display screen, and an input device connected through a system bus. The processor of the computer device is configured to provide calculation and control capabilities. The memory of the computer device includes a non-volatile storage medium and an internal memory. The non-volatile storage medium stores an operating system and computer programs. The internal memory provides an environment for operations of the operating system and the computer programs in the non-volatile storage medium. The network interface of the computer device is configured to communicate with an external terminal through a network connection. The computer programs are executed by the processor to implement a formal verification method for a storage smart contract. The display screen of the computer device can be a liquid crystal display screen or an electronic ink display screen. The input device of the computer device can be a touch layer covered on the display screen, or can be a button, trackball, or touchpad disposed on a housing of the computer device, or can also be an external keyboard, touchpad, mouse or the like.

Those skilled in the art can understand that the structure shown in FIG. 4 is only a block diagram of a part of the structure related to the solution of the present disclosure, and does not constitute a limitation on the computer device to which the solution of the present disclosure are applied. The computer device can specifically include more or fewer components than the components shown in the drawing, or combine certain components, or have a different component arrangement.

In an embodiment, a computer device is provided, and includes a memory and a processor. The memory stores computer programs. The processor is configured to execute the computer programs to implement steps in the above-mentioned formal verification method for the storage smart contract.

In an embodiment, a computer-readable storage medium is provided and includes computer programs stored thereon. The computer programs are executed by a processor to implement steps in the above-mentioned formal verification method for the storage smart contract.

Those skilled in the art can understand that all or part of procedures in the above-mentioned embodiment methods can be implemented by instructing relevant hardware through computer programs. The computer programs can be stored in a non-volatile computer-readable storage medium. When the computer programs are executed, the procedures in the above-mentioned method embodiments can be includes. Any reference to a memory, a storage, a database, or other media used in the embodiments provided by the present disclosure can include a non-volatile and/or volatile memory. The non-volatile memory can include a read-only memory (ROM), a programmable ROM (PROM), an electrically programmable ROM (EPROM), an electrically erasable programmable ROM (EEPROM), or a flash memory. The volatile memory can include a random access memory (RAM) or an external cache memory. As an illustration rather than a limitation, the RAM is available in many forms, such as a static RAM (SRAM), a dynamic RAM (DRAM), a synchronous DRAM (SDRAM), a double data rate SDRAM (DDRSDRAM), an enhanced SDRAM (ESDRAM), a synchronous chain channel (Synchlink) DRAM (SLDRAM), a memory bus (Rambus) direct RAM (RDRAM), a direct memory bus dynamic RAM (DRDRAM), a memory bus dynamic RAM (RDRAM) or the like.

Technical features of the above-mentioned embodiments can be combined arbitrarily. In order to make the description concise, all possible combinations of various technical features in the above-mentioned embodiments are not described. However, as long as the combinations of these technical features do not contradict, they should be regarded as the scope of the present disclosure.

The above-mentioned embodiments only express several embodiments of the present disclosure. Their description is more specific and detailed, but they cannot be understood as a limitation on the scope of the present disclosure. It should be pointed out that for those skilled in the art, modifications and improvements can be made without departing from the concept of the present disclosure, and these all fall within the protection scope of the present disclosure. Therefore, the protection scope of the present disclosure should be subject to the appended claims.

What is claimed is:

1. A formal verification method for a certificate storage smart contract, comprising:
    obtaining the certificate storage smart contract, and performing certificate storage, forensic, and certificate storage and forensic authority granting according to different production environments and authority;
    adding standardization statements of formal verification into the certificate storage smart contract, wherein the standardization statements are used for standardizing and describing the formal verification comprising abnormality, an incoming parameter, and outgoing parameter, state transfer of persistent variables, and invariants in a smart contract function; and
    obtaining a verification result by performing model verification on the certificate storage smart contract into which the standardization statements of the formal verification are added; when standardization of the formal verification is not met, locations of a sentence and the storage smart contract which do not meet the formal verification are positioned;
    wherein the obtaining the certificate storage smart contract and performing the certificate storage, the forensic, and the certificate storage and forensic authority granting according to the different production environments and authority comprise:
    using a persistent variable with a mapping type for recoding information of an identity of a certificate storage user and information of an identity of a forensic user, and using a persistent variable with an array type for recording information of an identity of an administrator;
    using multiple persistent variables with the mapping type for recording the certificate storage information in compliance with multiple certificate storage modes;
    using a modifier for performing authority control on the storage, the forensic, and the storage and forensic authority granting.

2. The formal verification method for the certificate storage smart contract of claim 1, wherein the adding the standardization statements of the formal verification into the certificate storage smart contract comprises the following steps:
    adding abnormality capture standardization comprising: standardizing and requiring a sufficient and necessary condition that abnormality occurs in a certificate storage scene to be that a certificate storage user does not have a certificate storage qualification and certificate storage data is invalid; standardizing and requiring a sufficient and necessary condition that abnormality occurs in a forensic scene to be that a forensic user does not have a forensic qualification and a forensic token does not exist; and all persistent variables cannot be changed in a situation that abnormality occurs;
    adding formal verification of the incoming parameter and the outgoing parameter comprising: performing the formal verification on the incoming parameter from the smart contract function, and performing expected verification on the outgoing parameter from the function; and
    adding standardization statements of the state transfer of the persistent variables comprising: confirming that in various types of certificate storage methods, a persistent variable with a mapping type in the certificate storage is added by the certificate storage data; confirming that in a method of the forensic, all persistent variables cannot be changed; and confirming a data change in a certificate user and forensic user information table in a method of the certificate storage and forensic authority granting.

3. The formal verification method for the certificate storage smart contract of claim 1, wherein the obtaining the verification result by performing the model verification on the certificate storage smart contract into which the standardization statements of the formal verification are added comprises the following step:
    performing, by a theorem prover, a theorem proving on the smart contract into which the standardization statements of the formal verification are added to obtain the verification result.

4. A computer device, comprising a memory and a processor, the memory storing computer programs, wherein the processor is configured to execute the computer programs to implement:
    obtaining the certificate storage smart contract, and performing certificate storage, forensic, and certificate storage and forensic authority granting according to different production environments and authority;
    adding standardization statements of formal verification into the certificate storage smart contract, wherein the standardization statements are used for standardizing and describing the formal verification comprising abnormality, an incoming parameter, an outgoing parameter, state transfer of persistent variables, and invariants in a smart contract function; and
    obtaining a verification result by performing model verification on the certificate storage smart contract into which the standardization statements of the formal verification are added; when standardization of the formal verification is met, the formal verification passes; and when the standardization of the formal verification is not met, locations of a sentence and the storage smart contract which do not meet the formal verification are positioned;

obtaining the certificate storage smart contract and performing the certificate storage, the forensic, and the certificate storage and forensic authority granting according to the different production environments and authority comprise:
    using a persistent variable with a mapping type for recoding information of an identity of a certificate storage user and information of an identity of a forensic user, and
    using a persistent variable with an array type for recording information of an identity of an administrator;
    using multiple persistent variables with the mapping type for recording the certificate storage information in compliance with multiple certificate storage modes; and
    using a modifier for performing authority control on the storage, the forensic, and the storage and forensic authority granting.

5. A non-transitory computer-readable storage medium, comprising computer programs stored thereon, characterized in that the computer programs are executed by a processor to implement:
    obtaining the certificate storage smart contract, and performing certificate storage, forensic, and certificate storage and forensic authority granting according to different production environments and authority;
    adding standardization statements of formal verification into the certificate storage smart contract, wherein the standardization statements are used for standardizing and describing the formal verification comprising abnormality, an incoming parameter, an outgoing parameter, state transfer of persistent variables, and invariants in a smart contract function; and
    obtaining a verification result by performing model verification on the certificate storage smart contract into which the standardization statements of the formal verification are added; when standardization of the formal verification is met, the formal verification passes; and when the standardization of the formal verification is not met, locations of a sentence and the storage smart contract which do not meet the formal verification are positioned; and
    obtaining the certificate storage smart contract and performing the certificate storage, the forensic, and the certificate storage and forensic authority granting according to the different production environments and authority comprise:
    using a persistent variable with a mapping type for recoding information of an identity of a certificate storage user and information of an identity of a forensic user, and
    using a persistent variable with an array type for recording information of an identity of an administrator;
    using multiple persistent variables with the mapping type for recording the certificate storage information in compliance with multiple certificate storage modes; and
    using a modifier for performing authority control on the storage, the forensic, and the storage and forensic authority granting.

6. The computer device of claim 4, wherein the adding the standardization statements of the formal verification into the certificate storage smart contract comprises the following steps:
    adding abnormality capture standardization comprising: standardizing and requiring a sufficient and necessary condition that abnormality occurs in a certificate storage scene to be that a certificate storage user does not have a certificate storage qualification and certificate storage data is invalid; standardizing and requiring a sufficient and necessary condition that abnormality occurs in a forensic scene to be that a forensic user does not have a forensic qualification and a forensic token does not exist; and all persistent variables cannot be changed in a situation that abnormality occurs;
    adding formal verification of the incoming parameter and the outgoing parameter comprising: performing the formal verification on the incoming parameter from the smart contract function, and performing expected verification on the outgoing parameter from the function; and
    adding standardization statements of the state transfer of the persistent variables comprising: confirming that in various types of certificate storage methods, a persistent variable with a mapping type in the certificate storage is added by the certificate storage data; confirming that in a method of the forensic, all persistent variables cannot be changed; and confirming a data change in a certificate user and forensic user information table in a method of the certificate storage and forensic authority granting.

7. The computer device of claim 4, wherein the obtaining the verification result by performing the model verification on the certificate storage smart contract into which the standardization statements of the formal verification are added comprises the following step:
    performing, by a theorem prover, a theorem proving on the smart contract into which the standardization statements of the formal verification are added to obtain the verification result.

8. The non-transitory computer-readable storage medium of claim 5, wherein the adding the standardization statements of the formal verification into the certificate storage smart contract comprises the following steps:
    adding abnormality capture standardization comprising: standardizing and requiring a sufficient and necessary condition that abnormality occurs in a certificate storage scene to be that a certificate storage user does not have a certificate storage qualification and certificate storage data is invalid; standardizing and requiring a sufficient and necessary condition that abnormality occurs in a forensic scene to be that a forensic user does not have a forensic qualification and a forensic token does not exist; and all persistent variables cannot be changed in a situation that abnormality occurs;
    adding formal verification of the incoming parameter and the outgoing parameter comprising: performing the formal verification on the incoming parameter from the smart contract function, and performing expected verification on the outgoing parameter from the function; and
    adding standardization statements of the state transfer of the persistent variables comprising: confirming that in various types of certificate storage methods, a persistent variable with a mapping type in the certificate storage is added by the certificate storage data; confirming that in a method of the forensic, all persistent variables cannot be changed; and confirming a data change in a certificate user and forensic user information table in a method of the certificate storage and forensic authority granting.

9. The non-transitory computer-readable storage medium of claim 5, wherein the obtaining the verification result by performing the model verification on the certificate storage smart contract into which the standardization statements of the formal verification are added comprises the following step:

performing, by a theorem prover, a theorem proving on the smart contract into which the standardization statements of the formal verification are added to obtain the verification result.

\* \* \* \* \*